United States Patent
Gowen (10) Patent No.: US 9,417,047 B2
(45) Date of Patent: Aug. 16, 2016

(54) THREE-DIMENSIONAL EDGE PROFILE DETERMINATION

(71) Applicant: Toyota Motor Engineering & Manufacturing North America, Inc., Erlanger, KY (US)

(72) Inventor: Kenneth T. Gowen, Elberfeld, IN (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/455,979

(22) Filed: Aug. 11, 2014

(65) Prior Publication Data

US 2016/0040972 A1 Feb. 11, 2016

(51) Int. Cl.
*G01B 5/20* (2006.01)
*G01B 7/28* (2006.01)

(52) U.S. Cl.
CPC .. *G01B 5/20* (2013.01); *G01B 7/28* (2013.01); *G01B 7/281* (2013.01)

(58) Field of Classification Search
CPC ............. G01B 5/20; G01B 7/28; G01B 7/281
USPC .................................... 33/544, 503
See application file for complete search history.

(56) References Cited

U.S. PATENT DOCUMENTS

| | | | | |
|---|---|---|---|---|
| 5,189,806 A * | 3/1993 | McMurtry | ............. | G01B 21/04 33/503 |
| 5,251,156 A * | 10/1993 | Heier | ................... | G01B 11/005 33/503 |
| 5,276,974 A * | 1/1994 | Chanoni | .................. | G01B 5/20 33/503 |
| 5,285,397 A * | 2/1994 | Heier | ................... | G01B 11/002 33/503 |
| 5,471,406 A * | 11/1995 | Breyer | ................. | G05B 19/401 33/503 |
| 6,611,791 B1 * | 8/2003 | Kase | ..................... | G01B 11/24 382/284 |
| 7,100,429 B2 * | 9/2006 | Matsuki | .................. | G01B 5/28 33/503 |
| 7,165,335 B2 * | 1/2007 | McMurtry | ............. | G01B 5/004 33/503 |
| 7,577,546 B2 * | 8/2009 | Subramaniam | ......... | G06T 17/20 702/167 |
| 7,747,080 B2 | 6/2010 | Chang et al. | | |

(Continued)

FOREIGN PATENT DOCUMENTS

| | | |
|---|---|---|
| DE | 10000250 A1 | 8/2000 |
| WO | 9111679 A1 | 8/1991 |

OTHER PUBLICATIONS

Crafty CNC, "Probe-It! Mach3 Wizard", retrieved from the Internet: <http://www.craftycnc.com/probe-it-wizard-mach3/>, retrieved Mar. 3, 2016 (9 pages).

(Continued)

*Primary Examiner* — Christopher Fulton
(74) *Attorney, Agent, or Firm* — Christopher G. Darrow; Darrow Mustafa PC (57) ABSTRACT

Systems and methods for determining a three-dimensional profile of an edge of an object are presented. The edge is defined by adjoining first and second surfaces. A first set of surface points can be detected on the first surface, and a second set of surface points can be detected on the second surface. The second set of surface points can correspond to the first set of surface points. A sensor, such as a contact sensor, can be used to detect the first and second set of surface points. Based on the detected first and second set of surface points, a profile of the edge can be determined automatically, such as by a processor operatively connected to the sensor. In this way, the profile of the edge can be determined without direct detection of the edge.

20 Claims, 6 Drawing Sheets

(56) References Cited

U.S. PATENT DOCUMENTS

| | | | |
|---|---|---|---|
| 7,809,523 B2* | 10/2010 | Hunter | G01B 21/04 33/503 |
| 7,918,036 B2* | 4/2011 | Ishikawa | G01B 5/28 33/503 |
| 8,175,842 B2* | 5/2012 | Cameron | F01D 5/141 33/546 |
| 2006/0007449 A1 | 1/2006 | Christoph et al. | |
| 2007/0033819 A1 | 2/2007 | McFarland | |
| 2008/0021672 A1* | 1/2008 | Powley | G01B 5/008 702/158 |
| 2009/0025463 A1 | 1/2009 | McFarland et al. | |
| 2009/0030648 A1 | 1/2009 | Hunter et al. | |
| 2009/0307916 A1 | 12/2009 | McLean et al. | |
| 2010/0011600 A1 | 1/2010 | Hunter et al. | |
| 2011/0192042 A1 | 8/2011 | McMurtry et al. | |
| 2011/0283553 A1 | 11/2011 | McFarland et al. | |
| 2014/0012409 A1 | 1/2014 | McMurtry et al. | |

OTHER PUBLICATIONS

Crafty CNC, "Probe-It! Mach 3 Wizard Introduction—YouTube", retrieved from the Internet: <http://www.youtube.com/watch?v=GOnflblYFtM>, retrieved Mar. 3, 2016 (2 pages).

Renishaw PLC, "SPRINTtm on-machine contact scanning system", retrieved from the Internet: <http://www.renishaw.com/en/sprint-on-machine-contact-scanning-system--20908>, retrieved Mar. 3, 2016 (4 pages).

Renishaw PLC, "OMP60 optical transmission probe", retrieved from the Internet: <http://www.renishaw.com/en/omp60-touch-probe-6101>, retrieved Mar. 3, 2016 (5 pages).

SNK America, Inc., "SNK America—RBM Series", retrieved from the Internet: <http://www.snkamerica.com/rb-m.php>, retrieved Mar. 3, 2016 (2 pages).

Hexagon Manufacturing Intelligence, "CMMs—Horizontal Arm", retrieved from the Internet: <http://hexagonmetrology.us/products/cmms-horizontal-arm>, retrieved Mar. 3, 2016 (2 pages).

Leica Geosystems, "Leica T-Probe—The Walk-Around CMM", retrieved from the Internet: <http://www.leica-geosystems.us/en/Leica-T-Probe__1835.htm>, retrieved Mar. 3, 2016 (1 page).

Hexagon Manufacturing Intelligence, "Absolute Arm—6 Axis", retrieved from the Internet: <http://hexagonmetrology.us/products/portable-measuring-arms/romer-absolute-arm#technical-specifications>, retrieved Mar. 11, 2016 (4 pages).

ATT Metrology Services, "Leica T-Scan/T-Probe/Laser Scanning/Laser Scanners", retrieved from the Internet: <https://web.archive.org/web/20140719031617/http://attinc.com/laser-scanners.htm>, retrieved Mar. 11, 2016 (last archived Jul. 19, 2014) (2 pages).

* cited by examiner

THREE-DIMENSIONAL EDGE PROFILE DETERMINATION

FIELD

The subject matter described herein relates in general to the measurement of physical geometric features of an object and, more particularly, to the measurement of an edge profile of an object.

BACKGROUND

Many techniques are known for measuring one or more physical geometric features or characteristics of an object. For instance, a workpiece may be inspected using a measurement apparatus, such as a coordinate measurement machine (CMM). Initially, a measurement path for the measurement apparatus must be defined and programmed. To do so, the workpiece is mounted on a table of the CMM and a measurement probe is brought into contact with the workpiece at a series of discrete positions to generate a series of data points. Such data points are collected and used to define a measurement path about the workpiece.

SUMMARY

In one respect, the present disclosure is directed to a method of determining a three-dimensional profile of an edge of an object. The object includes a first surface and a second surface. The first surface adjoins the second surface to define the edge. The method includes detecting a first set of surface points on the first surface. The method also includes detecting a second set of surface points on the second surface. The second set of surface points corresponds to the first set of surface points. The method further includes, based on the detected first and second set of surface points, automatically determining a profile of the edge without direct detection of the edge.

In another respect, the present disclosure is directed to a method of automatically determining a measurement path for an edge of an object. The object includes a first surface and a second surface. The first surface adjoins the second surface to define the edge.

The method includes detecting a first set of surface points on the first surface. The method includes detecting a second set of surface points on the second surface. The second set of surface points correspond to the first set of surface points. The method further includes automatically predicting where a future point will be along a profile of the edge at least partially based on one or more previously detected points of the first and second set of surface points. Such predicting where the future point will be along a profile of the edge occurs without a pre-programmed measurement path.

In still another respect, the present disclosure is directed to a system for determining a three-dimensional profile of an edge of an object. The object includes a first surface and a second surface. The first surface adjoins the second surface to define the edge. The system includes a sensor. The sensor is configured to detect a first set of surface points on the first surface and a second set of surface points on the second surface.

The system also includes a processor operatively connected to the sensor. The processor is configured to determine the first set of surface points on the first surface based on the sensor detecting the first set of surface points. The processor is also configured to determine the second set of surface points on the second surface based on the sensor detecting the second set of surface points. The second set of surface points correspond to the first set of surface points. Still further, the processor is configured to, based on the determined first and second set of surface points, automatically determine a profile of the edge without direct detection of the edge by the system.

DETAILED DESCRIPTION

This detailed description relates to determining a three-dimensional profile of an edge of an object. In addition, this detailed description relates to automatically determining a measurement path for an edge of an object. Such determinations include detecting surface points on the edge forming surfaces of the object to make such determinations without direct detection of the edge and/or without a pre-programmed measurement path. Still further, the present detailed description relates to systems and methods that incorporate features of both of these arrangements. Such systems and methods can, among other things, minimize the time and labor involved in pre-measurement set-up and preparation.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
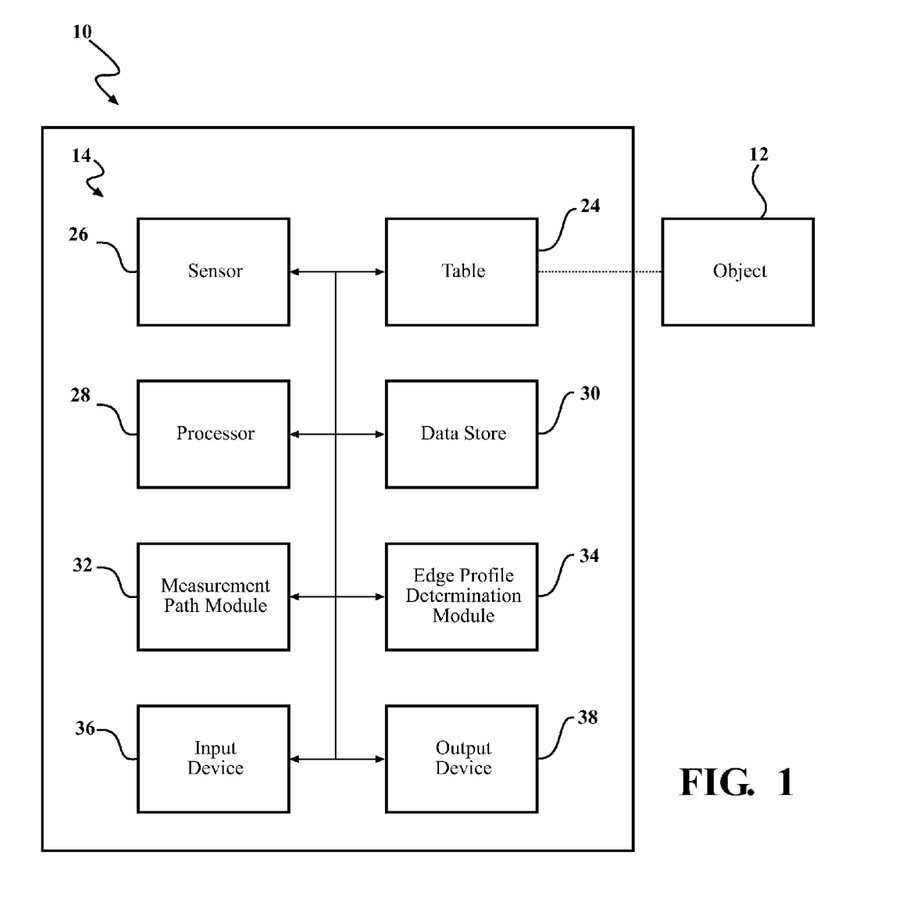
FIG. 1 is an example of a system for determining a three-dimensional profile of an edge of an object and/or for determining a measurement path for an edge of an object.

Referring to FIG. 1, an example of a system 10 for determining a three-dimensional profile of an edge of an object and/or for determining a measurement path for an edge of an object is shown. Some of the various possible elements of the exemplary system 10 shown in FIG. 1 will now be described.

It will be understood that it is not necessary for the system 10 to have all of the elements shown in FIG. 1 or described herein. The system 10 can have any combination of the various elements shown in FIG. 1.

The system 10 can include an object 12 and a measuring system 14. Each of these elements will be described in turn below.

Figure 2:
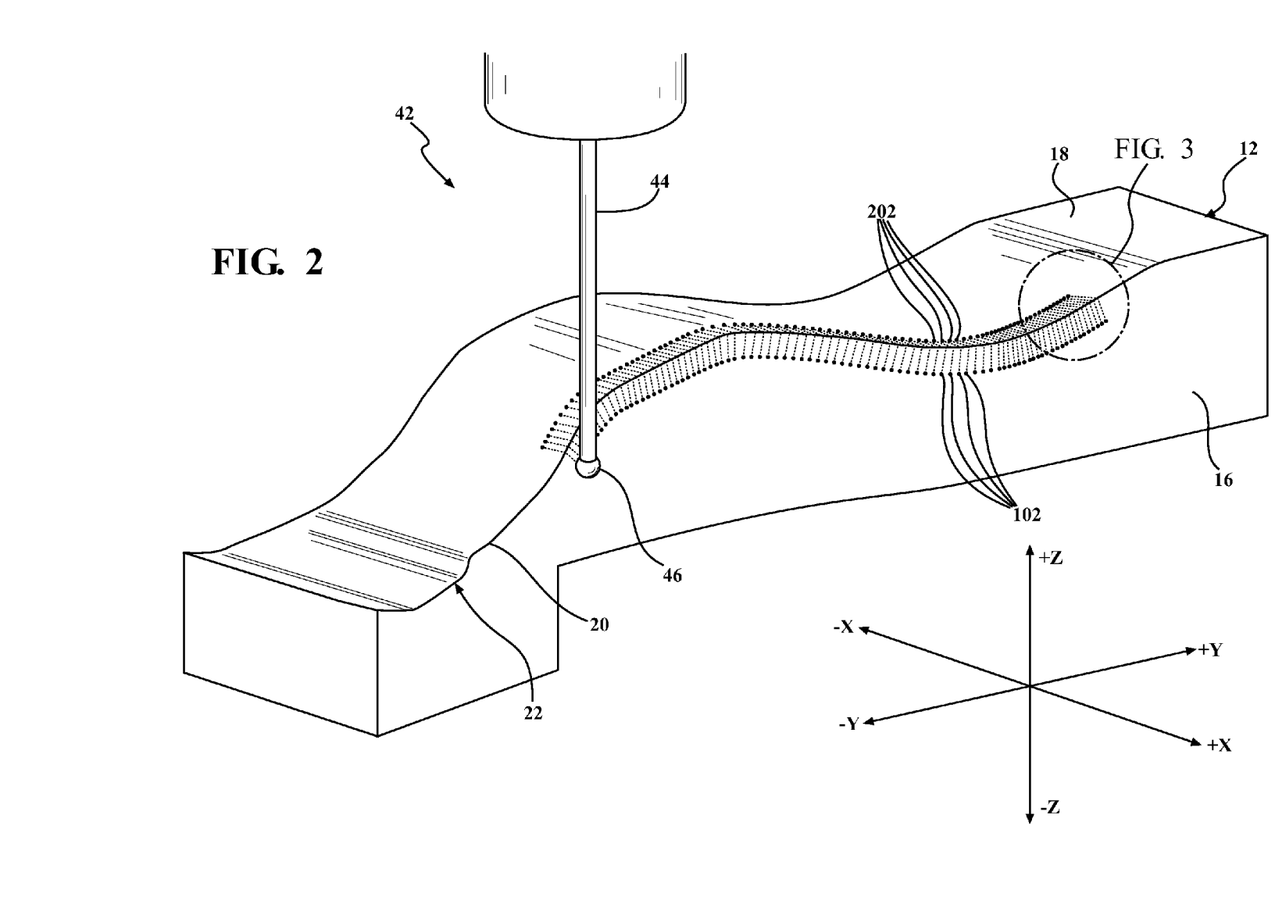
FIG. 2 is an example of a portion of an object having adjoining first and second surfaces that define an edge, showing a plurality of points being detected on the first and second surfaces.

Referring to FIG. 2, an example of a portion of the object 12 is shown. The object 12 can be made of any suitable material. The object 12 can be a solid object. The object 12 can have a plurality of surfaces. For instance, the object 12 can include a first surface 16 and a second surface 18. The first surface 16 can adjoin the second surface 18 to define an edge 20. An "edge" is defined as any transition between at least two adjoining surfaces of an object. In one or more arrangements, the edge 20 can be a convex or male edge, that is, an edge that projects outwardly.

The first surface 16 and/or the second surface 18 can be substantially planar. Alternatively, the first surface 16 and/or the second surface 18 can be non-planar. The first and second surfaces 16, 18 can be exterior surfaces of the object 12, or the first and second surfaces 16, 18 can be interior surfaces of the object 12. In one or more arrangements, one of the first and second surfaces 16, 18 can be an exterior surface of the object 12, and the other one of the first and second surfaces 16, 18 can be an interior surface of the object 12. In some instances, the edge 20 can be located on an exterior of the object 12. In other instances, the edge 20 can be located on an interior of the object 12.

The first surface 16 and the second surface 18 can have any suitable orientation with respect to each other. As an example, the first and second surfaces 16, 18 can be angled at substantially 90 degrees with respect to each other. As used herein, the term "substantially" includes exactly the term it modifies and slight variations therefrom. Thus, the term "substantially 90 degrees" means exactly 90 degrees and slight variations therefrom. As a further example, the first and second surfaces 16, 18 can be angled at an acute angle with respect to each other. Still further, the first and second surfaces 16, 18 can be angled at an obtuse angle with respect to each other.

The edge 20 can have an associated edge profile 22. The term "edge profile" is defined as the contour of at least a portion of the edge as expressed in a coordinate system. For instance, the edge profile 22 can be defined in a three-dimensional coordinate system. More particularly, the edge profile 22 can be defined by the Cartesian coordinate system relative to X, Y and Z axes. The edge profile 22 can have any suitable configuration. For instance, the edge profile 22 can be substantially linear. Alternatively, the edge profile 22 can be non-linear in one or more places along at least a portion of its length and/or in one or more directions.

Referring back to FIG. 1, as previously mentioned, the system 10 can include a measuring system 14. The term "measuring system" is defined as any device, apparatus, component, and/or system that can detect, determine, measure and/or estimate physical dimensions, features, characteristics and/or relationships of an object. For instance, the measuring system 14 can detect, determine, measure and/or estimate points on the first and/or second surfaces 16, 18 of the object 12. In one or more arrangements, the measuring system 14 can be a coordinate measurement machine (CMM), a portable CMM, a computer numerical control (CNC), three dimensional scanner, a universal measurement machine, or any suitable computer controlled machine that can detect, determine, measure and/or estimate physical dimensions, features, characteristics and/or relationships of an object, just to name a few possibilities.

Some of the various possible elements of a measuring system 14 shown in FIG. 1 will now be described. However, it will be understood that it is not necessary for the measuring system 14 to have all of the elements shown in FIG. 1 or described herein. The measuring system 14 can have any combination of the various elements shown in FIG. 1. Further, the measuring system 14 can include one or more additional elements in combination with one or more of the various elements shown in FIG. 1. The various possible features of the various measuring systems described above are well known.

The measuring system 14 can include a table 24 or other surface or apparatus upon which the object 12 can be supported. The measuring system 14 can be configured to allow the table 24 or other surface or apparatus to be positioned in any suitable number of degrees of freedom (e.g. 2, 3, 4, 5 or 6) and/or movable in any suitable manner along and/or about any suitable number of axes. The measuring system 14 can also include a sensor 26, a processor 28, a data store 30, a measurement path module 32, an edge profile determination module 34, an input device 36 and/or an output device 38. The various components of the measuring system 14 can be operatively connected in any suitable manner. The term "operatively connected," as used throughout this description, can include direct connections, indirect connections through a communication channel or pathway or another component or system, including connections without direct physical contact, such as through wireless links.

As an example, the various components of the measuring system 14 can be operatively connected by one or more communication networks. A "communication network" means one or more components designed to facilitate the delivery of information from one source to another. The one or more communication networks can be implemented as, or include, without limitation, a wide area network (WAN), wireless wide area network (WWAN), a local area network (LAN), wireless local area network (WLAN), a personal area network (PAN), the Internet, the Public Switched Telephone Network (PSTN), a wireless network, a mobile network, a Virtual Private Network (VPN), the Internet, and/or one or more intranets. The communication network(s) can include any combination of the above networks and/or other types of networks. The communication network(s) can include one or more routers, switches, access points, wireless access points, and/or the like. Accordingly, any number of the components of the measuring system 14 may be local to a particular location or remote to such a location.

As mentioned above, the measuring system 14 can include a sensor 26. "Sensor" means any device, component or system that can detect points on a surface. The sensor 26 can be any suitable type of sensor. For instance, the sensor 26 can be a contact sensor 42, an example of which is shown in FIG. 2, in which data points are generated based on contact between a portion of the sensor 26 and an object. The contact sensor 42 can be any suitable type of contact sensor, now known or later developed. In one or more arrangements, the sensor 26 may include a stylus 44 having a contacting tip 46. In one or more arrangements, the stylus 44 can be a deflectable stylus, as is known.

The measuring system 14 can be configured to enable the sensor 26 to be positioned in any suitable number of degrees of freedom (e.g. 2, 3, 4, 5, or 6) and/or movable in any suitable manner along and/or about any suitable number of axes. For instance, the sensor 26 can be mounted onto an articulating head. When the contacting tip 46 of the sensor 26 directly contacts the object 12, an output corresponding to the coordinate data at the point of contact can be generated. In some instances, the deflection of the stylus 44 can cause such an output to be generated. An output of the sensor 26 can be transmitted to the processor 28, the data store 30 and/or other elements of the measuring system 14.

However, it will be understood that the sensor 26 is not limited to being a contact sensor. Indeed, the sensor 26 can be a pressure sensor, a thermal sensor and/or a capacitive sensor. Moreover, direct physical contact of the sensor 26 with the object 12 may not be necessary, as the sensor 26 may be configured to detect surfaces of the object 12 without directly touching them, such as through radar or laser detection systems.

The measuring system 14 can include a processor 28, as also previously noted. "Processor" means any component or group of components that are configured to execute any of the processes described herein or any form of instructions to carry out such processes or cause such processes to be performed. The processor 28 may be implemented with one or more general-purpose and/or special-purpose processors. Examples of suitable processors 28 include microprocessors, microcontrollers, DSP processors, and other circuitry that can execute software. The processor 28 can be operable to control movements of the sensor 26.

The data store 30 can be configured to store various types of data. The data store 30 can include volatile and/or non-volatile memory. Examples of suitable data stores 30 may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, solid state drives, or any other suitable storage medium, or any combination thereof. The data store 30 can be operatively connected to the processor 28 for use thereby.

As noted above, the measuring system 14 can include a measurement path module 32 and an edge profile determination module 34. As an example, the measurement path module 32 and the edge profile determination module 34 may include any suitable combination of hardware and software, and both may be part of the processor 28 or may be separate components of the measuring system 14.

The measurement path module 32 can facilitate the automatic determination of a measurement path for an edge of an object in various ways. For instance, the measurement path module 32 can process data to automatically predict where future points will be along the profile 22 of the edge 20 of the object 12. The data can include, for example, previously detected surface points on the first and/or second surfaces 16, 18 of the object 12. The measurement path module 32 can be configured to perform such predicting without a pre-programmed measurement path.

The edge profile determination module 34 can facilitate the determination of a three-dimensional profile of an edge of an object in various ways. For instance, the edge profile determination module 34 can process data to automatically determine a profile of the edge. The data can include, for example, previously detected surface points on the first and/or second surfaces 16, 18 of the object 12. The edge profile determination module 34 can perform such determining without direct detection of the edge. "Without direct detection of the edge" means that the sensor does not directly contact or sense the edge of the object. Instead, the sensor detects surface points near the edge on each of the surfaces forming the edge 20 (e.g. the first and second surfaces 16, 18).

As noted above, the measuring system 14 can include an input device 36 for receiving input from a user. Any suitable input device 36 can be used, including, for example, a keypad, keyboard, display, touch screen, multi-touch screen, button, joystick, mouse, trackball, microphone and/or combinations thereof, just to name a few possibilities. The measuring system 14 can include an output device 38 for presenting information to the user. The output device 38 can include a display, a microphone, earphone, speaker and/or combinations thereof, just to name a few possibilities. Some components of the measuring system 14 may serve as both a component of the input device 36 and a component of the output device 38.

The input device 36 can receive any suitable input from the user. As an example, the user can input one or more measurement parameters. The measurement parameters can be any suitable parameters pertinent to the operation of the measuring system 14. In one or more arrangements, the measurement parameters can include one or more of the following: an adjustment distance, a surface pitch and an initial direction. Each of these measurement parameters will be described in more detail below.

Figure 3:
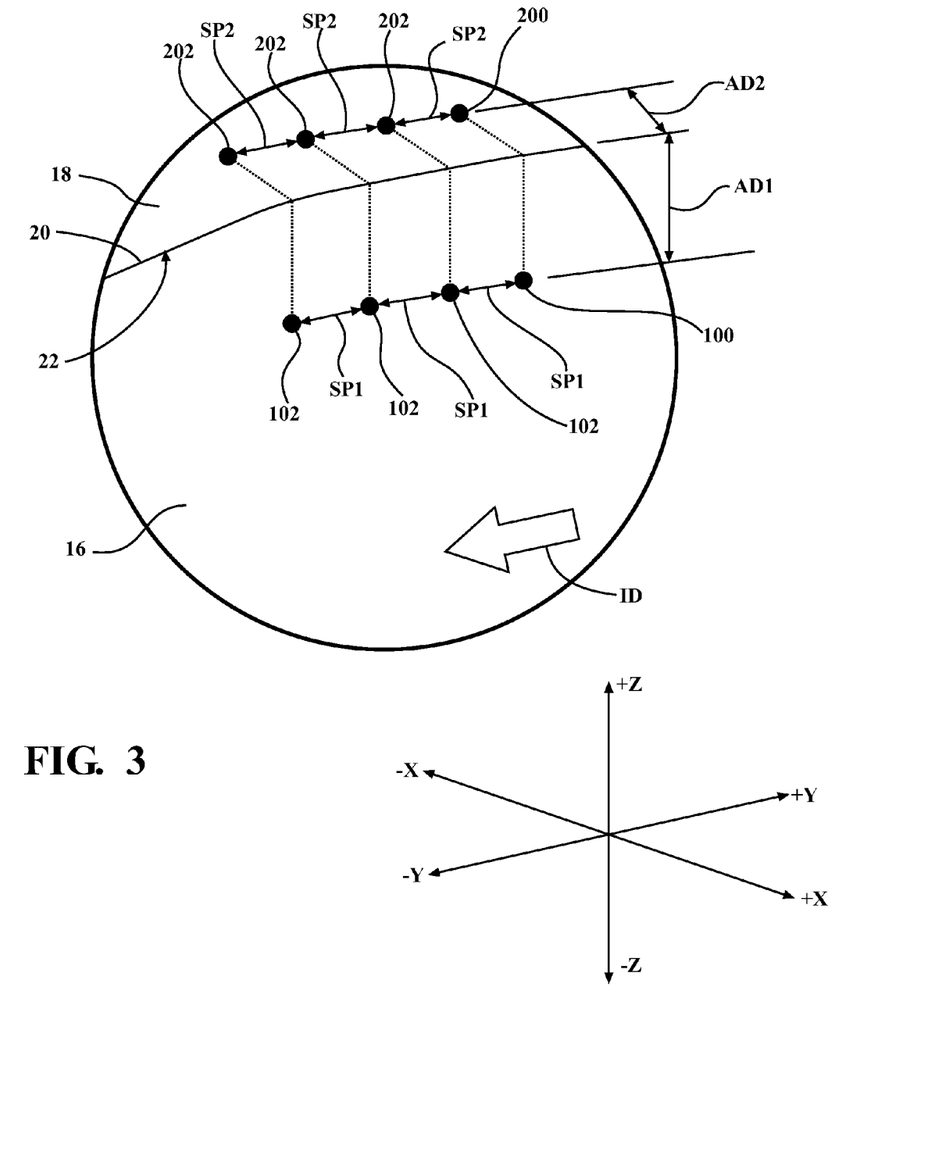
FIG. 3 is a close-up view of a portion of the object of FIG. 2, showing various measurement parameters associated with determining a three-dimensional profile of an edge of an object and/or determining a measurement path for an edge of an object.

Referring to FIG. 3, the adjustment distance can be an intended distance from a predicted future point in relation to the edge profile 22. The measuring system 14 can be configured to detect a surface point at such location. There can be an adjustment distance AD1 for the first surface 16 of the object 12 and/or an adjustment distance AD2 for the second surface 18 of the object 12. The adjustment distance for the first surface AD1 and/or the second surface AD2 of the object 12 can be defined by an end user; that is, an end user has the option to selectively assign a value for the adjustment distance for the first surface AD1 and/or the second surface AD2. Alternatively, the adjustment distance for the first surface and/or the second surface AD1, AD2 of the object 12 can be preconfigured by the measuring system 14 or by a system default. "Pre-configured" means that a value is predetermined such that an end user is not required to define the value in relation to some process or parameter (for example, the adjustment distance for the first surface and/or the second surface AD1, AD2).

The adjustment distance can be defined in any suitable manner and in any suitable unit of distance. In some arrangements, the adjustment distance AD1 for the first surface 16 can be equal to the adjustment distance AD1 for the second surface 16. In other arrangements, the adjustment distance AD1 for the first surface 16 and the adjustment distance AD1 for the second surface 16 can be unequal.

Another potential measurement parameter is the surface pitch. The surface pitch can correspond to an intended spacing between a set of surface points on a surface of the object 12. That is, the surface pitch can be the frequency at which surface point data is collected along the surface. For instance, there can be a surface pitch SP1 for the first surface 16 of the object 12 and/or a surface pitch SP2 for the second surface 18 of the object 12. The surface pitch for the first surface and/or the second surface SP1, SP2 can be defined by an end user. Alternatively, the surface pitch for the first surface and/or the second surface SP1, SP2 can be pre-configured. The surface pitch can be defined in any suitable manner and in any suitable unit of distance.

In some arrangements, the surface pitch for the first surface SP1 can be equal to the surface pitch of the second surface SP2. In other arrangements, the surface pitch for the first surface SP1 and the surface pitch of the second surface SP2 can be unequal. In some instances, the surface pitch for the second surface SP2 can be defined relative to the surface pitch of the first surface SP1. As an example, the surface pitch SP2 for the second surface 18 can be defined relative to a specified quantity of surface points detected on the first surface 16.

Thus, a point on the second surface 18 can be detected for every n points detected on the first surface 16. Such a relationship can be expressed in any suitable manner, including, for example, as a ratio. Any suitable ratio can be used, including, for example, 1:1, 2:1, 3:1, 4:1, 5:1, . . . n:1.

Moreover, the surface pitch may not necessarily be the same for each of the surface points on a particular surface. For example, the surface pitch for the first surface SP1 may vary along the first surface 16, if so desired. As another example, the surface pitch for the second surface SP2 may vary along the second surface 18. Such a feature may be useful in instances in which the object 12 has surfaces with varying degrees of planarity. In one particular example, a higher surface pitch may be used for portions of the surface that are highly contoured, while a lower surface pitch may be employed in this locations where the surface is more planar or otherwise less contoured.

Still another potential measurement parameter is the initial direction ID. The initial direction ID can be a direction from a first point on an edge-forming surface (e.g. the first or second surface 16, 18) of the object 12 in which the measuring system 14 will detect a second point on the edge-forming surface of the object. The initial direction ID can be defined in any suitable manner. The initial direction ID can be defined by an end user; that is, an end user has the option to selectively assign a value for the initial direction. Alternatively, the initial direction ID can be pre-configured by the measuring system 14 or by a system default such that an end user is not required to define the initial direction ID.

Figure 4:
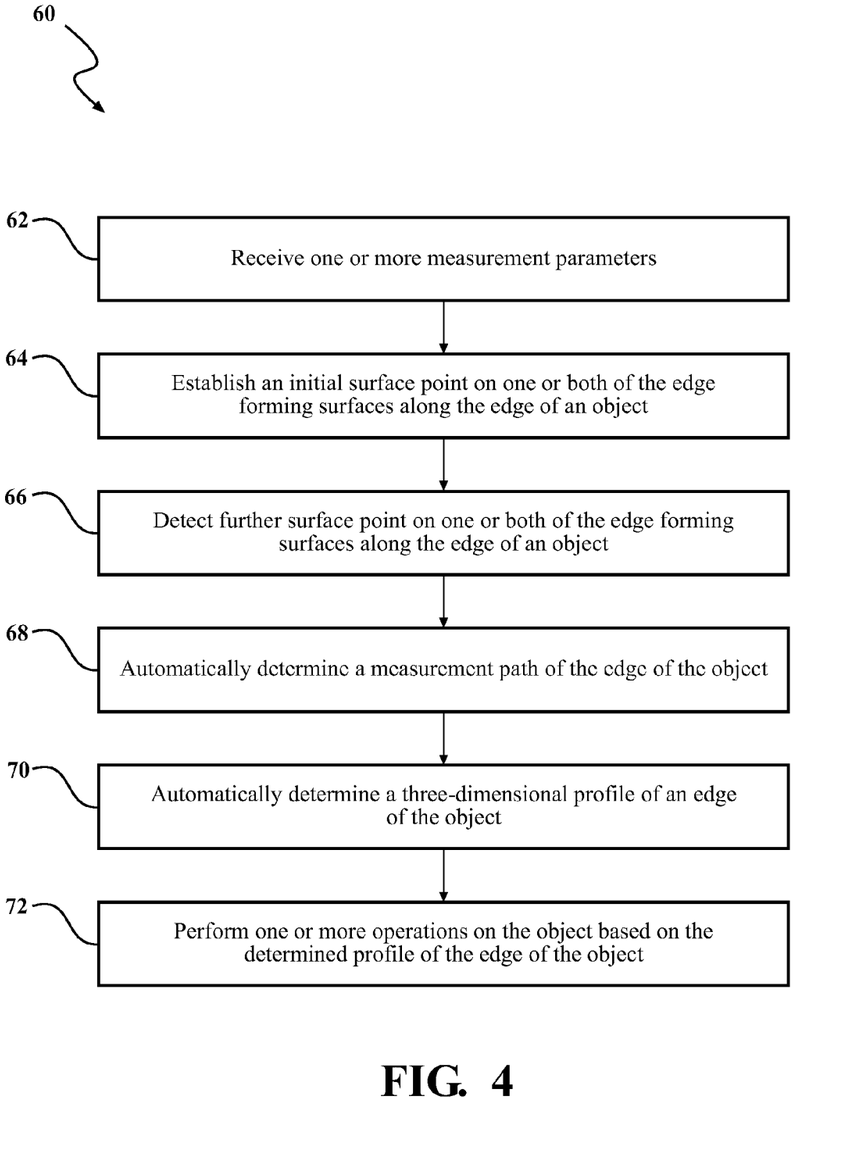
FIG. 4 is an example of an edge profile determination method.

Now that the various potential components of the system 10 have been described, one manner of the operation of such system will be presented. Referring to FIG. 4, an example of an edge profile determination method 60 is shown. Various possible steps of method 60 will now be described. The method 60 illustrated in FIG. 4 may be applicable to the embodiments described above in relation to FIGS. 1-3, but it is understood that the method 60 can be carried out with other suitable systems and arrangements. Moreover, the method 60 may include other steps that are not shown here, and in fact, the method 60 is not limited to including every step shown in FIG. 4. The steps that are illustrated here as part of the method 60 are not limited to this particular chronological order, either. Indeed, some of the steps may be performed in a different order than what is shown and/or at least some of the steps shown can occur simultaneously.

At block 62, one or more measurement parameters can be received. The one or more measurement parameters can be any suitable measurement parameter, including any of those described above. At block 64, an initial point on one or both of the edge-forming surfaces of an object can be established. At block 66, a second point along one or both of the edge-forming surfaces of the object can be detected.

At block 68, a measurement path along an edge of an object can be automatically determined. "Measurement path" means a path along at least a portion of the object along which the measuring system and/or a component thereof may detect future data points. According to arrangements described herein, the measurement path is not pre-programmed into the measurement system 14 and, therefore, is determined. The measurement path can be determined in a real-time manner. The measurement path can be automatically determined in any suitable manner. One example of automatic determining a measurement path along an edge of an object is presented in connection with FIG. 5, as will be described in greater detail below.

At block 70, a three-dimensional profile of an edge of an object can be automatically determined. The profile can be automatically determined in any suitable manner. One example of automatically determining a three-dimensional profile of an edge of an object is described in connection with FIG. 6, as will be described in greater detail below. At block 72, one or more operations can be performed on the object based on the determined profile of the edge of the object.

One example of the method 60 will now be described. This non-limiting example will be described in relation to FIGS. 2 and 3, and the X-Y-Z axes will be used to help explain positions and directional movements. Positive and negative directions on the X-Y-Z coordinate axes are used to facilitate the description and are not intended to be limiting. When, for example, it is indicated that the contacting tip 46 of the sensor is moved in the negative X direction, it means that the contacting tip 46 is generally moved in that direction. It does not necessarily mean that the contacting tip 46 is actually located in a negative X portion of the X axis.

As noted above, the method 60 can include receiving one or more measurement parameters. For purposes of this example, a user can input an initial direction ID, an adjustment distance for the first surface AD1, a surface pitch for the first surface SP1 and a surface pitch for the second surface SP2. The adjustment distance for the second surface AD2 can be pre-configured. For purposes of this example, the surface pitch for the first surface SP1 and the surface pitch for the second surface SP2 can be equal. The user can input one or more of these measurement parameters using the input device 36.

As mentioned above, the method 60 can include establishing a first surface point on one or both of the edge forming surfaces of an object. For purposes of this example, the first surface 16 of the object 12 is a substantially vertical surface and is substantially defined by the Y-Z plane. A first surface point 100 can be detected on the first surface 16 of the object 12, as shown in FIG. 3. The first surface point 100 can be an initial point on the first surface 16 and can be located in any suitable location on the first surface 16. The location of the first surface point 100 can be set by an operator of the measuring system 14, or the location of the first surface point 100 can be set automatically by the measuring system 14. In one or more arrangements, the first surface point 100 can be located any suitable distance below the edge 20 in the negative Z direction. As an example, the first surface point 100 can be located below the edge 20 in the negative Z direction at a distance of about the adjustment distance for the first surface AD1.

The first surface point 100 can be established in any suitable manner, such as by using the sensor 26. For this example, the sensor 26 is a contact sensor with a contacting tip 46 (see FIG. 2). In one or more implementations, the first surface point 100 can be established by directing the contacting tip 46 in the negative X direction towards a desired location of the first surface 16. The processor 28 can then determine a coordinate position of the first surface point 100—in relation to the X-Y-Z axes—and can store this data in the data store 30.

Once the first surface point 100 is established, a second surface point 200 for the second surface 18 can be established. For example, the contacting tip 46 can be retracted from the first surface 16 in the positive X direction. The contacting tip 46 can then be moved upwardly in the positive Z direction above the edge 20. Here, the contacting tip 46 may be positioned away from the edge 20 in the positive X direction and above the edge 20 in the positive Z direction. The location of the contacting tip 46 in the Y direction can remain substantially unchanged from the location of the first surface point 100.

The contacting tip 46 can then be moved back toward the edge 20 in the negative X direction such that it is positioned an adjustment distance AD2 over the second surface 18 from the edge 20. The contacting tip 46 can be lowered in the negative Z direction and brought into contact with the second surface 18 to establish the second surface point 200 thereon. At this point, the processor 28 can determine the position of the second surface point 200 in relation to the X-Y-Z axes and can record this data in the data store 30. In one arrangement, once the first surface point 100 and the second surface point 200 are established, the process of determining and detecting future points along the first and second surfaces 16, 18 and the generation of a profile of the edge 20 may begin.

As noted above, the method 60 can include, at block 68, automatically determining a measurement path for the edge 20 of the object 12. One example of automatically determining a measurement path along an edge of an object is presented in connection with FIG. 5, as will be described in greater detail below. Generally, automatically determining the measurement path for the edge 20 of the object includes determining a future surface point along the edge 20 for detection by the measuring system 14.

Further, as noted above, the method 60 can include at block 72 performing one or more operations on the object 12 based on the determined profile of the edge 20 of the object 12. As an example, the object 12 can be a stamping die and the edge 20 can be a trim edge. After repeated use of such die, the trim edge can become dull. Accordingly, in such case, the one or more operations can include machining at least a portion of the object 12. More particularly, the first surface 16 of the object 12 can be machined, such as by using an end mill or other suitable cutting device, by having the cutting device follow along the determined profile of the edge 20 of the object 12. As a result, the trim edge of the die can be sharpened. It will be understood that arrangements are not limited to the operations being or including machining. Indeed, other types of operations (e.g. coating) can be performed on the object 12. Also, arrangements are not limited to the object 12 being a die.

Figure 5:
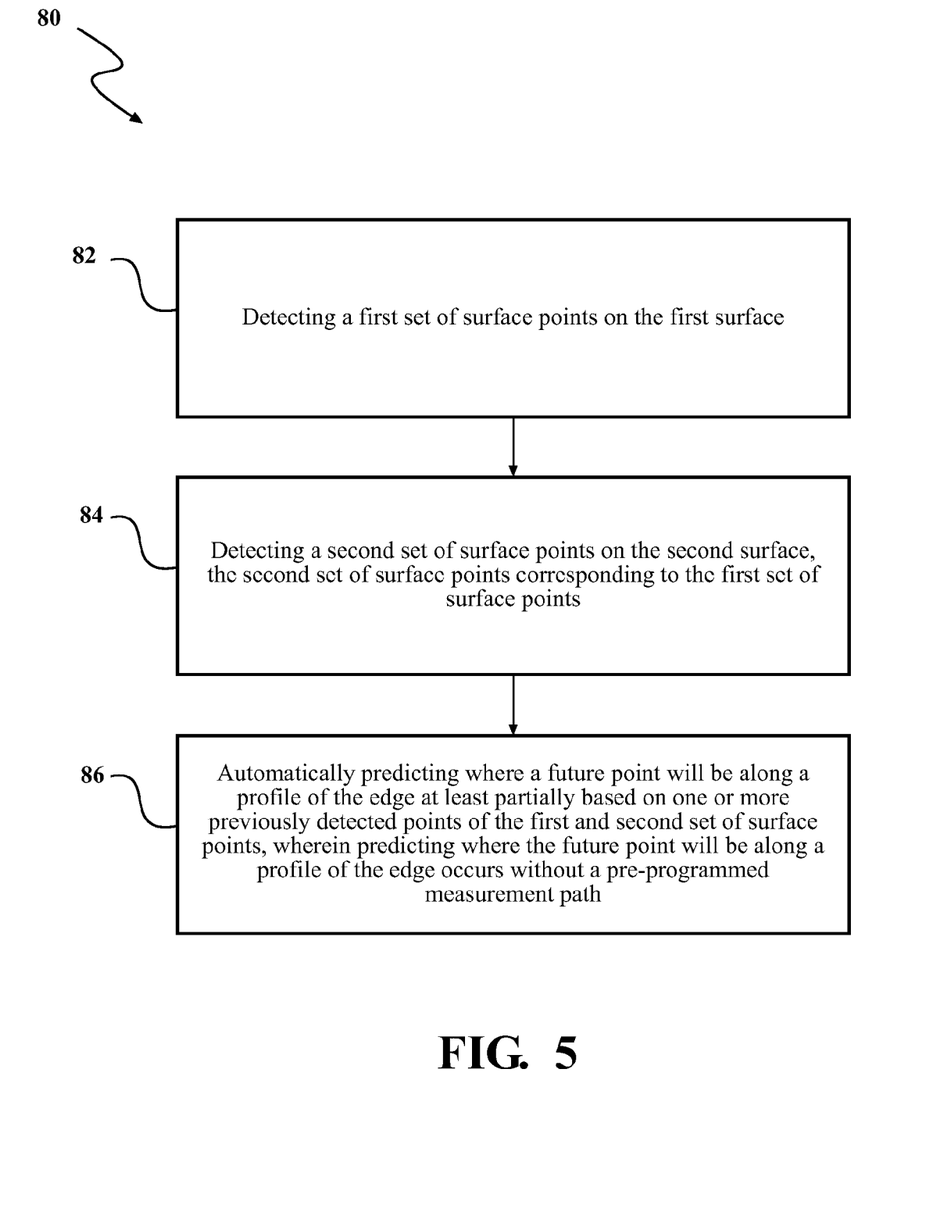
FIG. 5 is an example of a method of determining a measurement path along an edge of an object.

As explained in relation to block 68 of FIG. 4, a measurement path for an edge of an object can be automatically determined. Referring to FIG. 5, an example of a method 80 of such a process is shown. Various possible steps of method 80 will now be described. The method 80 illustrated in FIG. 5 may be applicable to the embodiments described above in relation to FIGS. 1-4, but it is understood that the method 80 can be carried out with other suitable systems and arrangements. Moreover, the method 80 may include other steps that are not shown here, and in fact, the method 80 is not limited to including every step shown in FIG. 5. The steps that are illustrated here as part of the method 80 are not limited to this particular chronological order, either. Indeed, some of the steps may be performed in a different order than what is shown and/or at least some of the steps shown can occur simultaneously.

At block 82, a first set of surface points 102 on the first surface 16 can be detected. As used herein, the term "set of surface points" includes one or more points. At block 84, a second set of surface points 202 on the second surface 18 can be detected. At block 86, the location of where a future point will be along a profile of the edge can be automatically predicted.

One example of the method 80 will now be described. A non-limiting example of such alternating detection will now be described in relation to FIGS. 2 and 3, and the X-Y-Z axes will be used to help explain directional movements and positions. For purposes of this example, the first surface 16 is a substantially vertical surface and is substantially defined by a Y-Z plane. The second surface 18 is a substantially horizontal surface and is substantially defined by an X-Y plane. However, it will be understood that arrangements are not limited to the first and/or second surfaces 16, 18 being planar or located in the particular planes noted above. Indeed, the first and/or second surfaces can be non-planar or freeform surfaces that are defined by any combination of two or more axes. Also, for this example, the first surface pitch SP1 is equal to the second surface pitch SP2.

The first set of surface points 102 can be detected in any suitable manner. For instance, the contacting tip 46 can be used to detect the first set of surface points 102. In one or more implementations, the first set of surface points 102 can be detected by contacting the contacting tip 46 to the first surface 16. The processor 28 can then determine a coordinate position of the first surface points 102—in relation to the X-Y-Z axes—and can store this data in the data store 30. In one or more arrangements, the measuring system 14 can be configured so that the contacting tip 46 is substantially normal to the first surface 16 when contact is made with the first surface 16.

At block 84, a second set of surface points 202 on the second surface 18 can be detected. The second set of surface points 202 can be detected in any suitable manner. For instance, the contacting tip 46 can be used to detect the second set of surface points 202. In one or more implementations, the second set of surface points 202 can be detected by contacting the contacting tip 46 to the second surface 18. The processor 28 can then determine a coordinate position of the second surface points 202—in relation to the X-Y-Z axes—and can store this data in the data store 30. In one or more arrangements, the measuring system 14 can be configured so that the contacting tip 46 is substantially normal to the second surface 18 when contact is made with the second surface 18.

The second set of surface points 202 can correspond to the first set of surface points 102. At least some of the points of the second set of surface points 202 can be substantially aligned with a respective point of the first set of surface points 100. In one or more arrangements, each point of the second set of surface points 200 can be substantially aligned with a respective one of the points of the first set of surface points 100. Further, in this context, "substantially aligned" means that the points have at least one of the X, Y or Z coordinates that are substantially the same. For instance, one of the points of the first set of surface points 102 can be located at X1, Y1, Z1, and a corresponding one of the second set of surface points 202 can be located at X2, Y2, Z2. In this example, X1 and X2 can be non-equal, Y1 can be substantially equal to Y2, and Z1 and Z2 can be non-equal.

In one or more arrangements, detecting the first set of surface points 102 can occur before or after detecting the second set of surface points 202. In one or more arrangements, detecting the first set of surface points 102 can occur alternatingly with detecting the second set of surface points 202. Such alternating can be determined according to a received first surface pitch, second surface pitch and/or other parameter.

A non-limiting example of such alternating detection will now be described in relation to FIGS. 2 and 3, and the X-Y-Z axes will be used to help explain directional movements and positions. After detecting a surface point 102 on the first surface 16, the contacting tip 46 of the sensor 26 can be withdrawn from contact with the first surface 16 and moved away from the first surface 16 (in the positive X direction). The contacting tip 46 can be moved upwardly a distance above the edge 20 (in the positive Z direction). The distance the contacting tip 46 is moved above the edge 20 can be equal to at least the adjustment distance AD1 for the first surface 16 plus the diameter of the contacting tip 46 of the sensor 26 and, in at least some instances, an additional distance safety factor. At this point, the contacting tip 46 is positioned away from the edge 20 in the positive X and Z directions (above and away from the edge 20).

The contacting tip 46 can then be moved back toward the edge 20 such that it is positioned at least the adjustment distance AD2 over the second surface 18 in the negative X direction in FIG. 2). The contacting tip 46 can be lowered (in the negative Z direction) and brought into contact with the second surface 16 to detect a surface point 202 thereon. After detecting the surface point 202 on the second surface 18, the contacting tip 46 can be withdrawn from contact with and raised above the second surface 18 (in the positive Z direction).

The contacting tip 46 can be moved across the second surface 18 in the positive X direction to a point beyond the edge 20. The contacting tip 46 can be moved a distance equal to at least the adjustment distance AD2 for the second surface 18 plus the diameter of the contacting tip 46 and, in at least some instances, an additional distance safety factor. At this point, the contacting tip 46 is positioned away from the edge 20 in the positive X and Z directions (above and away from the edge 20).

The contacting tip 46 can be lowered in the negative Z direction a distance based at least partially on the adjustment distance AD1 of the first surface 16. The contacting tip 46 can be moved along the first surface 16 in the negative Y direction to the location of a predicted future surface point 102 on the first surface 16. The contacting tip 46 can be brought into contact with the first surface 16 at such location to detect a surface point 102 thereon. The above process can be repeated until an end of the object 12 or measurement path is reached or until stopped by an operator.

As noted above, at block 86, the location of where a future point will be along the profile 22 of the edge 20 can be automatically predicted. Predicting where the future point will be along the profile 22 of the edge 20 can occur without a pre-programmed measurement path. "Without a pre-programmed measurement path" means that the measuring system 14 does not follow a predetermined measuring path. The term "along a profile of the edge" means on the profile 22 of the edge 20 and/or on one of the first and/or second surfaces 16, 18 of the object 12 that define the edge 20.

In one or more arrangements, automatically predicting where the future point will be along the profile 22 of the edge 20 can be performed in real-time. As used herein, the term "real-time" means a level of processing responsiveness that a user or system senses as sufficiently immediate for a particular process or determination to be made, or that enables the processor to keep up with some external process.

It should be noted that the automatically predicting can be performed in any suitable manner. For instance, automatically predicting where a future point will be along a profile 22 of the edge 20 can be at least partially based on one or more previously detected points 100, 200, 102, 202 of the first and second set of surface points. In one or more arrangements, the automatically predicting can be at least partially based on the two immediately previously detected points 102 of the first set of surface points and the two immediately previously detected points 202 of the second set of surface points. In such case, the automatically predicting can include determining a line and/or the slope of a line defined by the two immediately previously detected points of the first and second set of surface points 102, 202 and extrapolating the line and/or slope to a future location along the profile 22 of the edge 20.

However, it will be understood that arrangements are not limited to automatically predicting at least partially based on the two immediately previously detected points 102 of the first set of surface points and the two immediately previously detected points 202 of the second set of surface points. Indeed, in some arrangements, the automatically predicting can be at least partially based on more than the two immediately previously detected points 102 of the first set of surface points and/or more than the two immediately previously detected points 202 of the second set of surface points. For instance, the automatically predicting can be at least partially based on the three or more immediately previously detected points of the first set of surface points 102 and/or the three or more immediately previously detected points of the second set of surface points 202. In such case, the automatically predicting can include calculating a curve to fit the three or more immediately previously detected points of the first and/or second set of surface points 102, 202. Such a curve can be extrapolated to a future location along the profile 22 of the edge 20.

An adjustment distance AD1 and/or AD2 can be received. The adjustment distance AD1 and/or AD2 can correspond to an intended distance from the predicted future point in relation to the profile 22 of the edge 20. If an adjustment distance AD1 and/or AD2 is received, predicting where the future point will be along the profile 22 of the edge 20 can be further based on the received adjustment distance AD1 and/or AD2.

Alternatively or in addition, a surface pitch can be received. The surface pitch SP1 can correspond to an intended spacing between the first set of surface points 100, 102 on the first surface 16. If a surface pitch SP1 is received, predicting where the future point will be along the profile 22 of the edge 20 can be further based on the received surface pitch SP1.

It should be noted that, as future points of the first and second set of points 102, 202 are detected, the measuring system 14 can be configured to account for differences between the predicted location of the future point and the actual detected location of the point. For instance, if the contacting tip 46 is moved towards the predicted point but contacts the respective surface before reaching the intended location, the coordinate data can be recorded for the actual location of the point. On the other hand, if the contacting tip 46 is moved towards the predicted point but the contacting tip 46 has not contacted or detected a surface, the system can be configured to allow the contacting tip 46 to over-travel at least some distance. Once contact is made between the contacting tip 46 and the respective surface, the processor 28 can determine the position of the surface point in relation to the X-Y-Z axes and can record this data in the data store 30. In predicting future points of the first and second set of points 102, 202, the measuring system 14 can account for the actual position of the point in the prediction of a future point.

Figure 6:
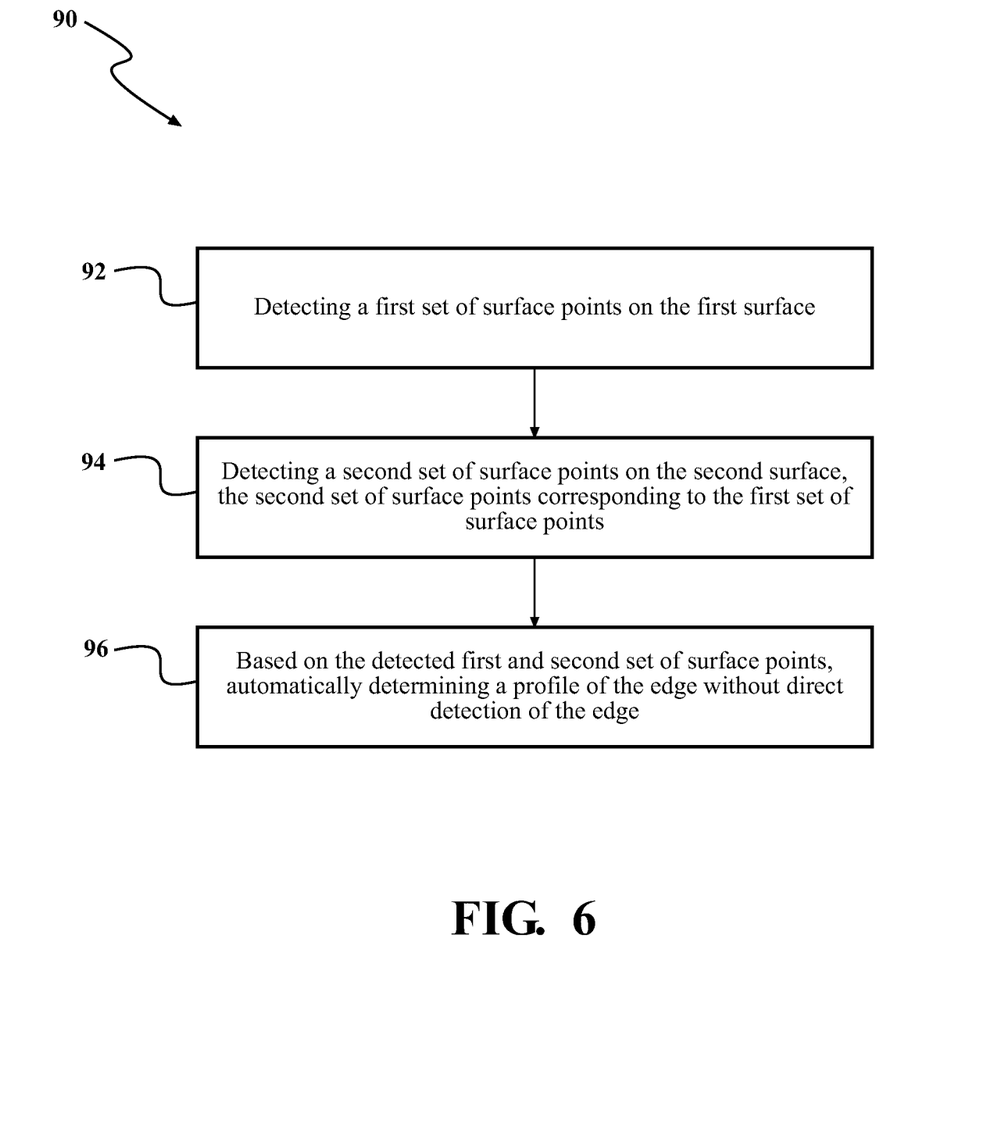
FIG. 6 is an example of a method of determining a three-dimensional profile of an edge of an object.

As explained in relation to block 70 of FIG. 4, a three-dimensional profile of an edge of an object can be determined. Referring to FIG. 6, an example of a method 90 of such a process is shown. Various possible steps of method 90 will now be described. The method 90 illustrated in FIG. 6 may be applicable to the embodiments described above in relation to FIGS. 1-4, but it is understood that the method 90 can be carried out with other suitable systems and arrangements. Moreover, the method 90 may include other steps that are not shown here, and in fact, the method 90 is not limited to including every step shown in FIG. 6. The steps that are illustrated here as part of the method 90 are not limited to this particular chronological order, either. Indeed, some of the steps may be performed in a different order than what is shown and/or at least some of the steps shown can occur simultaneously.

At block 92, a first set of surface points 102 can be detected on the first surface 16. At block 94, a second set of surface points 202 on the second surface 18 can be detected. The second set of surface points 202 can correspond to the first set of surface points 102. The above discussion of similar steps in connection with the method 80 in FIG. 5 applies equally to blocks 92 and 94. Further, detecting the first set of surface points 102 on the first surface 16 can include predicting where the first set of surface points 102 will be on the first surface 16. Alternatively or in addition, detecting the second set of surface points 202 on the second surface 18 can include predicting where the second set of surface points 202 will be on the second surface 18.

At block 96, a profile 22 of the edge 20 is automatically determined without direct detection of the edge 20. The profile 22 of the edge can be automatically determined based on the detected first and second set of surface points 102, 202. In some instances, the profile 22 of the edge 20 can further be automatically determined based on the first surface point 100 of the first surface 16. Alternatively or in addition, the profile 22 of the edge 20 can be automatically determined based on the second surface point 200 of the second surface 18. In one or more arrangements, automatically determining the profile 22 of the edge 20 includes automatically determining the profile 22 of the edge 20 in real-time.

A non-limiting example of one manner of automatically determining the profile 22 of the edge 20 will now be described. One of the detected points of the first set of surface points 102 can be located at X1, Y1, Z1, and a corresponding one of the detected points of second set of surface points 202 can be located at X2, Y2, Z2. In this example, X1 can be non-equal to X2, Y1 can be equal to Y2, and Z1 can be non-equal to Z2. To automatically determine the profile, the measuring system 14 (e.g. edge profile determination module 34) can be configured to determine that, based on this corresponding pair of surface points 102, 202, the profile 22 of the edge 20 for this pair of points is located at X1, Y1, Z2. The measuring system 14 can continue to determine the profile 22 of the edge 20 in such a manner.

In some instances, such as when the first surface pitch SP1 is different from the second surface pitch SP2, there may not be a corresponding detected point of the second set of points for a detected one of the points of the first set of points (e.g. at X3, Y3, Z3). In such case, the measuring system 14 (e.g. edge profile determination module 34) can be configured to determine that the profile of the edge is at X3, Y3, Zp, where Zp is the coordinate value along the Z axis at the last previously detected point 202 of the second set of points. The edge profile 22 can maintain this coordinate value Zp until another point of the second set of points 202 is detected.

In one or more arrangements, the method 90 can include receiving a first surface pitch SP1 corresponding to an intended spacing between the first set of surface points 102 on the first surface 16. In such case, predicting where the first set of surface points 102 will be on the first surface 16 can be at least partially based on the received first surface pitch SP1.

In one or more arrangements, the method 90 can further include receiving an adjustment distance AD1 for the first surface 16 corresponding to an intended distance from the profile 22 of the edge 20 in the negative Z direction. In such case, predicting where the future points of the first set of surface points 102 will be on the first surface 16 can also be at least partially based on the received adjustment distance AD1. In one or more arrangements, the method 90 can also include receiving a second surface pitch SP2 corresponding to an intended spacing between the second set of surface points 202 on the second surface 18. In such case, predicting where the future points of the second set of surface points 202 will be on the second surface 18 can be at least partially based on the received second surface pitch SP2. In one or more instances, the first surface pitch SP1 can be different than the second surface pitch SP2. Predicting where the first set of surface points 102 will be on the first surface 16 and predicting where the second set of surface points 202 will be on the second surface 18 can also at least partially based on the determined profile 22 of the edge 20.

It will be appreciated that arrangements described herein can provide numerous benefits, including one or more of the benefits mentioned herein. For instance, the initial user input can be minimized. Further, arrangements described herein can avoid the initial pre-programming of the edge profile data before actual data collection occurs, as is required in other data collection systems. Still further, arrangements described herein can provide an accurate determination of an edge profile. As an example, arrangements described herein can provide accuracy to the limit of the particular equipment being used. Moreover, arrangements described herein are highly repeatable. Arrangements described herein can be implemented into existing technology. Moreover, such implementation can be attained without modification or change to the associated hardware of such technology. As such, arrangements described herein can be implemented with low investment.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages including but not limited to, an object oriented programming language such as Java™, Smalltalk, C++ or the like and conventional procedural programming languages, such as the "C" programming language or similar programming languages. In one or more arrangements, the computer program code can be written in any suitable form (e.g. ASCII text) in the G-code programming language. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of determining a three-dimensional profile of an edge of an object, the object including a first surface and a second surface, the first surface adjoining the second surface to define the edge, the method comprising:
    detecting a first set of surface points on the first surface;
    detecting a second set of surface points on the second surface, the second set of surface points corresponding to the first set of surface points; and
    based on the detected first and second set of surface points, automatically determining a profile of the edge without direct detection of the edge.

2. The method of claim 1, wherein automatically determining a profile of the edge includes automatically determining the profile of the edge in real-time.

3. The method of claim 1, wherein detecting the first set of surface points on the first surface includes predicting where the first set of surface points will be on the first surface and wherein detecting the second set of surface points on the second surface includes predicting where the second set of surface points will be on the second surface.

4. The method of claim 3, further including:
    receiving a first surface pitch corresponding to an intended spacing between the first set of surface points on the first surface; and
    wherein predicting where the first set of surface points will be on the first surface is at least partially based on the received first surface pitch.

5. The method according to claim 4, further including:
    receiving an adjustment distance corresponding to an intended distance from the edge; and
    wherein predicting where the first set of surface points will be on the first surface is also at least partially based on the received adjustment distance.

6. The method of claim 4, further including:
    receiving a second surface pitch corresponding to an intended spacing between the second set of surface points on the second surface;
    wherein predicting where the second set of surface points will be on the second surface is at least partially based on the received second surface pitch.

7. The method of claim 6, wherein the first surface pitch is different than the second surface pitch.

8. The method according to claim 6, wherein predicting where the first set of surface points will be on the first surface and predicting where the second set of surface points will be on the second surface are also at least partially based on the determined profile of the edge.

9. A method of automatically determining a measurement path for an edge of an object, the object including a first surface and a second surface, the first surface adjoining the second surface to define the edge, the method comprising:
    detecting a first set of surface points on the first surface;
    detecting a second set of surface points on the second surface, the second set of surface points corresponding to the first set of surface points; and
    automatically predicting where a future point will be along a profile of the edge at least partially based on one or more previously detected points of the first and second set of surface points,
    wherein predicting where the future point will be along a profile of the edge occurs without a pre-programmed measurement path.

10. The method of claim 9, further including:
    receiving an adjustment distance corresponding to an intended distance from the predicted future point in relation to the profile of the edge;
    wherein predicting where the future point will be along the profile of the edge is further based on the adjustment distance.

11. The method of claim 10, further including receiving a surface pitch corresponding to an intended spacing between the first set of surface points on the first surface, wherein predicting where the future point will be along the profile of the edge is further based on the received surface pitch.

12. The method of claim 9, wherein automatically predicting where the future point will be along the profile of the edge includes automatically predicting where the future point will be along the profile of the edge in real-time.

13. A system for determining a three-dimensional profile of an edge of an object, the object including a first surface and a second surface, the first surface adjoining the second surface to define the edge, the system comprising:
- a sensor configured to detect a first set of surface points on the first surface and a second set of surface points on the second surface; and
- a processor operatively connected to the sensor, the processor being configured to:
  - determine the first set of surface points on the first surface based on the sensor detecting the first set of surface points;
  - determine the second set of surface points on the second surface based on the sensor detecting the second set of surface points, the second set of surface points corresponding to the first set of surface points; and
  - based on the determined first and second set of surface points, automatically determine a profile of the edge without direct detection of the edge by the system.

14. The system of claim 13, wherein the processor is further configured to automatically determine the profile of the edge in real-time.

15. The system of claim 13, wherein the processor is further configured to predict where the first set of surface points will be on the first surface and where the second set of surface points will be on the second surface.

16. The system of claim 15, further including:
- an input device operatively connected to the processor, wherein the input device is configured to receive a first surface pitch corresponding to an intended spacing between the first set of surface points on the first surface; and wherein the processor is further configured to predict where the first set of surface points will be on the first surface at least partially based on the received first surface pitch.

17. The system of claim 16, wherein the input device is further configured to receive an adjustment distance corresponding to an intended distance from the edge; and
wherein the processor is further configured to predict where the first set of surface points will be on the first surface at least partially based on the received adjustment distance.

18. The system of claim 16, wherein the input device is further configured to receive a second surface pitch corresponding to an intended spacing between the second set of surface points on the second surface; and
wherein the processor is further configured to predict where the second set of surface points will be on the second surface at least partially based on the received second surface pitch.

19. The system of claim 15, wherein the processor is further configured to predict where the first set of surface points will be on the first surface and to predict where the second set of surface points will be on the second surface at least partially based on previous determination of at least some of the first set of surface points and based on previous determination of at least some of the second set of surface points.

20. The system of claim 13, wherein the sensor is a contact sensor such that the sensor is configured to detect the first set of surface points on the first surface and the second set of surface points on the second surface through direct physical contact respectively with the first and second surfaces.

* * * * *